United States Patent [19]

Phillips et al.

[11] Patent Number: 4,759,973
[45] Date of Patent: Jul. 26, 1988

[54] SEMI-FOAMED POLYETHYLENE MOLDING TAPE

[75] Inventors: Raymond J. Phillips, Oakdale, Conn.; Douglas O'Brien, West Chicago, Ill.

[73] Assignee: The United States of America as represented by the Secretary of the Navy

[21] Appl. No.: 3,352

[22] Filed: Dec. 12, 1986

[51] Int. Cl.⁴ .............................. C08J 9/00; B32B 3/26
[52] U.S. Cl. .................................... 428/220; 428/332; 428/339; 521/79; 521/143
[58] Field of Search ................... 521/79, 143; 428/332, 428/339, 220

[56] References Cited

U.S. PATENT DOCUMENTS 4,499,141  2/1985  Paisley et al. ...................... 521/79
4,525,297  6/1985  Yamane et al. ...................... 521/79

Primary Examiner—William J. Van Balen
Attorney, Agent, or Firm—Arthur A. McGill; Prithvi C. Lall; Michael J. McGowan

[57] ABSTRACT

A semi-foamed polyethylene tape for use in the molding of foamed jacket polyethylene cables. After tumble mixing low density foaming polyethylene, ethylene vinyl acetate co-polymer and polyethylene color concentrate, the tape is extruded on a thermoplastic extruder having a maddox mixing screw that effectively mixes polyethylene compounds and a slot die with a suitable opening dimension. The tape is then quenched. By controlling manufacturing variables the tape is foamed to 40% to 50% of its maximum. The tape is then foamed to 100% maximum during the manufacturing of a cable assembly.

4 Claims, 3 Drawing Sheets

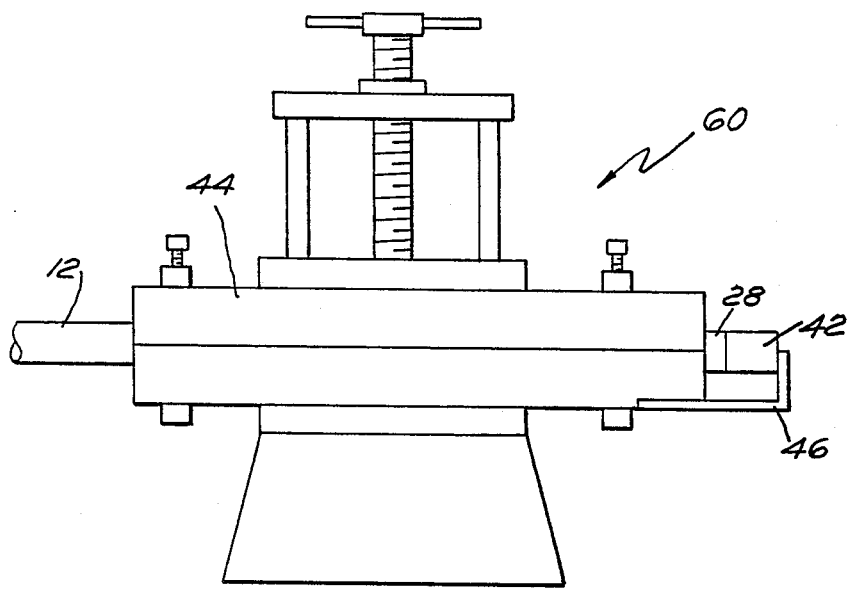
F I G. 10
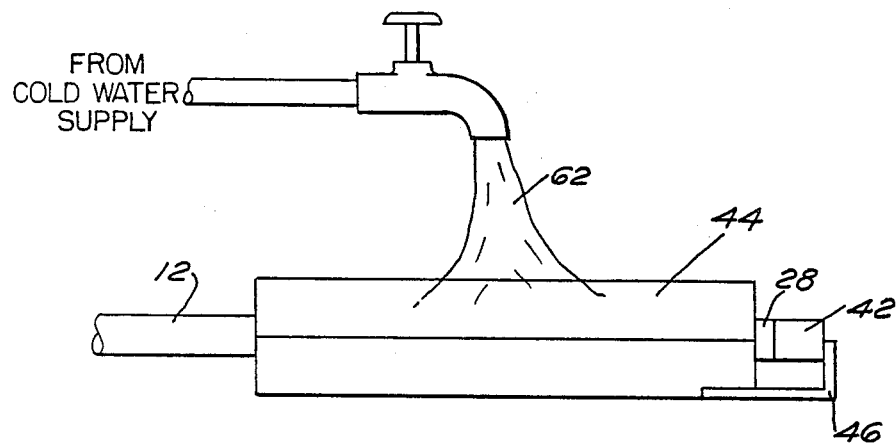
F I G. 11

SEMI-FOAMED POLYETHYLENE MOLDING TAPE

STATEMENT OF GOVERNMENT INTEREST

The invention described herein may be manufactured and used by or for the Government of the United States of America for governmental purposes without the payment of any royalties thereon or therefor.

This patent application is co-pending with related patent application Ser. No. 003,020 entitled "Method of Making a Cable Assembly for Use in an Antenna Element Assembly" by the same inventors filed on the same date as this patent application.

BACKGROUND OF THE INVENTION (1) Field of the Invention

The present invention relates to an insulated covering for electrical hardware and more particularly to a tape covering for bonding a cable jacket to the strength member of an electrical connector for use in a cable system that is buoyant in seawater.

(2) Description of the Prior Art

Prior systems used strips of cable jacket material or polyethylene tape or a combination of both. Because the jacket material had been foamed to its optimum buoyant cable characteristics during cable manufacture, further heating/molding always increased the density of the material. This resulted in a less flexible cable section of higher specific gravity that was more prone to stress cracking. These are not desirable characteristics for the present buoyant cable system.

SUMMARY OF THE INVENTION

The present invention provides a polyethylene tape that is quenched immediately following extrusion so that it is foamed to a predetermined percent of its maximum. The tape is molded to the strength members of an electrical connector and buoyant polyethylene electrical cable jacket to provide a transition from the cable to the connector. The tape has low molding temperature, high flexibility after molding and low density/specific gravity. After molding it closely approximates the basic buoyant polyethylene electrical cable jacket material.

BRIEF DESCRIPTION OF THE DRAWING

FIG. 10 shows the mold assembly of FIG. 9 placed into a typical mold heater;

FIG. 11 shows the mold assembly being cooled after removal from the mold heater of FIG. 10.

DESCRIPTION OF THE PREFERRED EMBODIMENT

Figure 1:
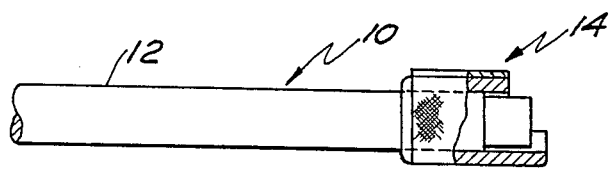
FIG. 1 shows a buoyant cable and sizing tool in accordance with the present invention.
Figure 2:
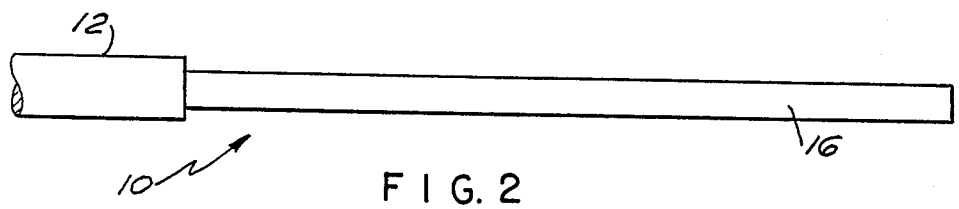
FIG. 2 shows the buoyant cable of FIG. 1 after having been operated on by the sizing tool.

Referring now to FIG. 1 there is shown a polyethylene cable 10 that has an outer diameter at one end 12 of approximately ⅜". A typical cable sizing tool 14 is placed over the other end of the cable and the polyethylene jacket 16 is reduced to a cable diameter of 0.375" to 0.380" for a distance of 8" as shown in FIG. 2.

Figure 3:
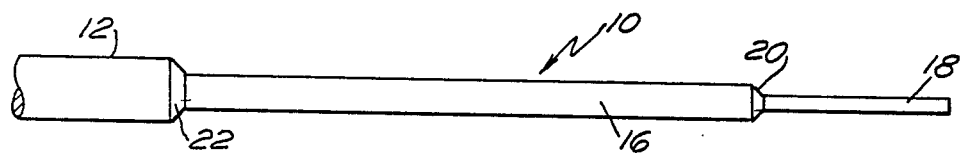
FIG. 3 shows the buoyant cable of FIG. 2 after having a portion of its outer jacket removed and having the remaining jacket chamfered in two places.

Refer now to FIG. 3. The outer jacket 16 is completely removed for a distance of 2". If there are any strength strands such as aramid fibers, these should also be removed for the same distance. The cable 10 has an inner dielectric cover 18 that is now exposed for this 2" distance. The cable 10 is chamfered at a 45° angle in two places 20 and 22.

Figure 4:
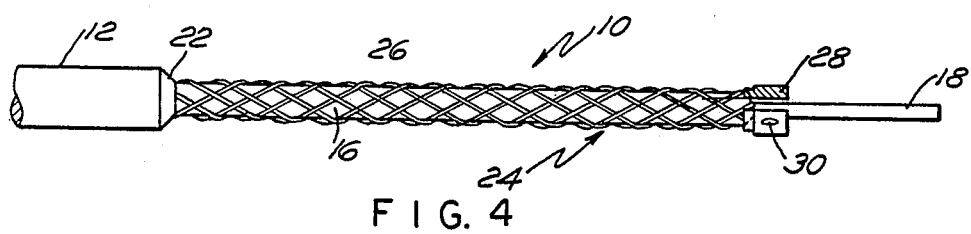
FIG. 4 shows a grip connector placed on the buoyant cable of FIG. 3.

FIG. 4 shows a grip connector 24 comprising a wire mesh 26 and sleeve 28 having a plurality of threaded apertures 30, for connecting any exterior components such as termination tips, amplifier housings, connectors, etc. The grip connector 24 is pushed onto the cable 10 and the wire mesh 26 is moved down jacket 16 until the inner end of the sleeve 28 meets the chamfered end 20 of the jacket 16. The wire mesh 26 is worked toward chamfered end 22 until the mesh 26 lies evenly on jacket 16.

Figure 5:
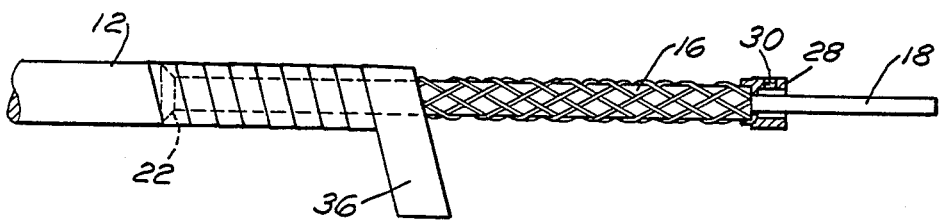
FIG. 5 shows a foamed tape partially wrapped around the configuration of FIG. 4.
Figure 6:
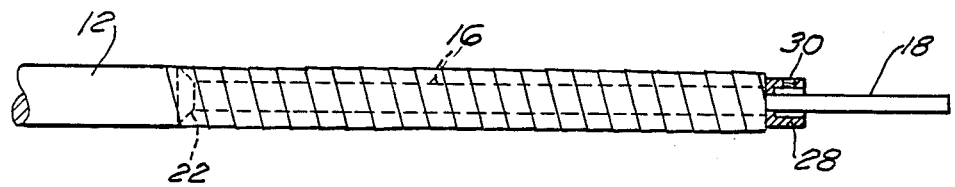
FIG. 6 shows the completed wrapping of the foamed tape of FIG. 5.

Refer now to FIGS. 5 and 6. A foamed tape 36 is wrapped from chamfered end 22 to sleeve 28. At this time prior to molding the foamed tape 36 covers a section 38 that is between 0.650" and 0.675" diameter.

Figure 7:
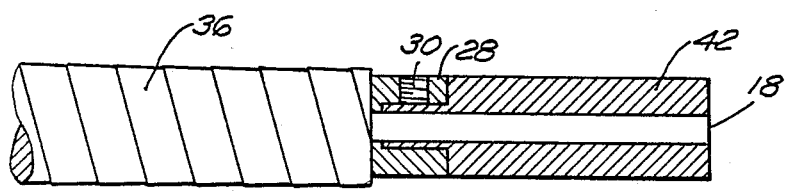
FIG. 7 shows a dielectric protector added to the configuration of FIG. 6.

A dielectric protector 42 is placed radially outward of dielectric 18 and inserted into sleeve 28 as shown in FIG. 7. If necessary the dielectric 18 may be trimmed so as to be flush with the dielectric protector 42.

Figure 8:
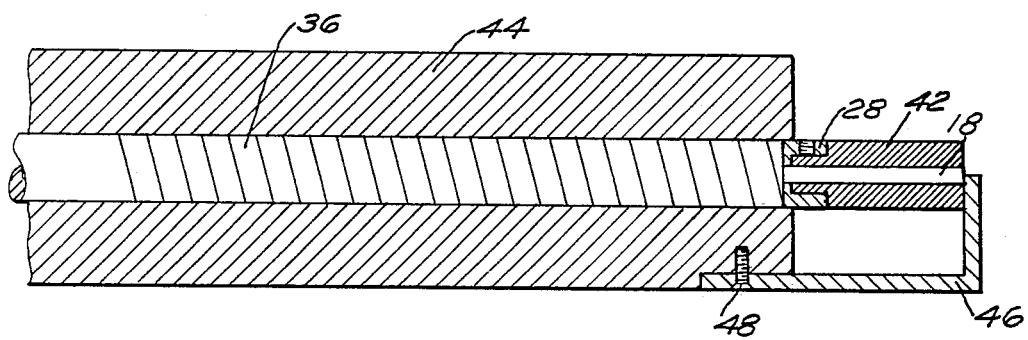
FIG. 8 shows the configuration of FIG. 7 inserted into a split mold assembly.
Figure 9:
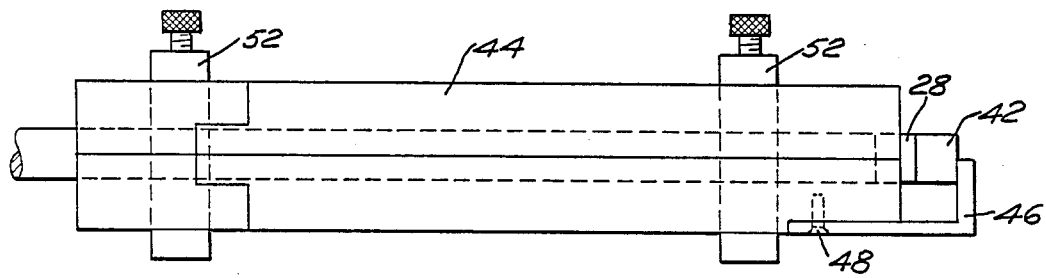
FIG. 9 shows the split mold assembly of FIG. 8 secured by two "C" clamps.

Refer now to FIGS. 8 and 9. An aluminum split mold assembly 44 has the prepared cable, described with reference to FIGS. 1–7, inserted into it. An extension L shaped piece 46 is affixed to mold 44 by at least one screw 48 to mold assembly 44. The piece 46 is used to position the cable assembly in the mold 44. The mold assembly 44 is secured with two "C" clamps 52.

The mold assembly 44 is then placed into a typical mold heater 60, as shown in FIG. 10, and heated at 375° F. plus or minus 10° F. for four minutes. The mold assembly 44 is then taken from the heater and has cold water 62 run over it, as shown in FIG. 11, until the mold assembly 44 is cool to touch. The "C" clamps 52 are then loosened and the mold assembly 44 is removed.

Figure 12:
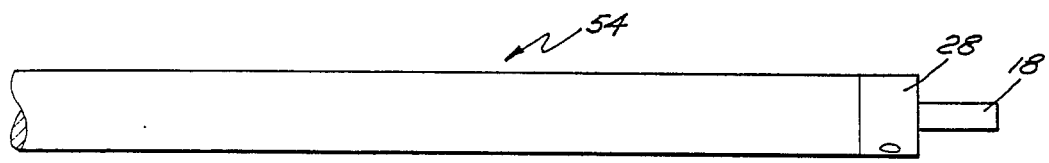
FIG. 12 shows the completed cable assembly.

A completed cable assembly 54 is shown in FIG. 12.

The tape 36 used is a new product made of the following materials:

Low Density Foaming Polyethylene—100.00 parts
Ethylene Vinyl Acetate Co—Polymer—15.00 parts
Polyethylene Color Concentrate—1.20 parts The above materials are tumble—mixed for 20 minutes plus/minus one minute in a clean fiber drum. The mixture is then extruded on a thermoplastic extruder having a maddox mixing screw for effectively mixing polyethylene compounds. The slot die of the extruder is selected for having suitable opening dimensions dependent on the size of the tape. In the present case the extrusion variables, familiar to those skilled in the art were adjusted to produce a tape of approximately ⅝" width. The width not being a particularly critical dimension. The thickness was 0.042" plus/minus 0.003".

The tape has a specific gravity of 0.60 plus/minus 0.05 and a Hardness Shore A: 82A plus/minus 2.

The additive ethylene vinyl acetate co-polymer promotes better bonding and flexibility. The tape is quenched in a linear cooling tank immediately on extrusion so as to arrest the inherent foaming action. The optimum product will be foamed to 40% to 50% of its maximum. Subsequent heating during heating/molding will utilize the remaining 50% to 60% of the foaming potential.

Suitable products for use in making the tape 36 are Union Carbide DFD4960 for use as the low density foaming polyethylene, DuPont Elvax 260 for use as the ethylene vinyl acetate co-polymer and Wilson 50 Bk 306 for use as the polyethylene color concentrate.

One advantage of the above described tape 36 is that it provides a more flexible molded section than the prior art, more closely approximating the flexibility of the basic buoyant cable. This allows the molded connectors, splices, etc. to pass over/through seals, sheaves, capstans, etc. with a lessened potential for stress cracking and jacket failure. Another advantage is that the specific gravity of the molded portions are as buoyant as the original cable.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A molding tape for use in providing insulated covering for electrical hardware comprising:
   substantially 100.00 parts of low density foaming polyethylene;
   substantially 15.00 parts of ethylene vinyl acetate co-polymer; and
   substantially 1.20 parts of polyethylene color concentrate.

2. A molding tape for use in providing insulated covering for electrical hardware according to claim 1 wherein said tape is foamed to 40% to 50% of its maximum foaming capability.

3. A molding tape for use in providing insulated covering for electrical hardware according to claim 2 wherein said tape has a thickness of 0.042" plus/minus 0.003".

4. A molding tape for use in providing insulated covering for electrical hardware according to claim 3 wherein said tape has a specific gravity of 0.6-plus/minus 0.05 and hardness Shore A: 82 plus/minus 2.

* * * * *